(12) United States Patent
Biermann et al.

(10) Patent No.: US 11,067,160 B2
(45) Date of Patent: Jul. 20, 2021

(54) METHOD FOR ASSEMBLING A DRIVE UNIT

(71) Applicant: Schaeffler Technologies AG & Co. KG, Herzogenaurach (DE)

(72) Inventors: Thorsten Biermann, Wachenroth (DE); Thorsten Meyerhöfer, Göttelhöf (DE); Philipp Storner, Möhrendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 208 days.

(21) Appl. No.: 16/084,039

(22) PCT Filed: Feb. 7, 2017

(86) PCT No.: PCT/DE2017/100089
§ 371 (c)(1),
(2) Date: Sep. 11, 2018

(87) PCT Pub. No.: WO2017/182016
PCT Pub. Date: Oct. 26, 2017

(65) Prior Publication Data
US 2020/0292050 A1    Sep. 17, 2020

(30) Foreign Application Priority Data
Apr. 18, 2016    (DE) ...................... 10 2016 206 479.7

(51) Int. Cl.
*F16H 57/023*    (2012.01)
*F16C 19/16*    (2006.01)
(Continued)

(52) U.S. Cl.
CPC ........... *F16H 57/023* (2013.01); *F16C 19/16* (2013.01); *F16H 57/021* (2013.01);
(Continued)

(58) Field of Classification Search
CPC ......... F16H 57/023; F16H 2057/02034; F16H 2057/0056; F16H 2057/0062;
(Continued)

(56) References Cited

U.S. PATENT DOCUMENTS 4,209,724 A * 6/1980 Periou ...................... H02K 1/17
                                                      310/154.03
5,804,224 A * 9/1998 Inaba ................... B29C 45/1777
                                                      425/150
(Continued)

FOREIGN PATENT DOCUMENTS

DE    4341354 A1    6/1995
DE    10215997 A1   10/2002
(Continued)

*Primary Examiner* — Jeremy R Severson
(74) *Attorney, Agent, or Firm* — Reid Baldwin

(57) ABSTRACT

Drive units for a vehicle having an electric machine and a transmission device are disclosed, as well as methods for assembling the drive units. The method may include mounting the transmission device in a transmission housing; passing an assembly mandrel axially through an aperture in the transmission housing and through a pinion shaft, which is designed as a hollow shaft and is rotatably mounted in the transmission housing; and centering a rotor shaft, which is designed at least partially as a hollow shaft, on the assembly mandrel. A rotor of the electric machine may be pushed axially onto the rotor shaft; the rotor shaft may be inserted axially into the pinion shaft, wherein a set of splines on the rotor shaft engages in a set of splines on the pinion shaft; a stator of the electric machine may be pushed axially onto the rotor of the electric machine and fixing the stator on the transmission housing; and the assembly mandrel may be removed and the aperture in the transmission housing may be closed with a closure cover.

17 Claims, 1 Drawing Sheet

(51) Int. Cl.
*F16H 57/021* (2012.01)
*F16H 57/031* (2012.01)
*H02K 7/116* (2006.01)
*H02K 15/16* (2006.01)
*F16H 57/00* (2012.01)
*F16H 57/02* (2012.01)

(52) U.S. Cl.
CPC ........... *F16H 57/031* (2013.01); *H02K 7/116* (2013.01); *H02K 15/16* (2013.01); *F16H 2057/0056* (2013.01); *F16H 2057/0062* (2013.01); *F16H 2057/02034* (2013.01)

(58) Field of Classification Search
CPC ..... F16H 57/021; F16H 57/031; H02K 15/16; H02K 7/116; F16C 19/16
See application file for complete search history.

(56) References Cited

U.S. PATENT DOCUMENTS

| | | | |
|---|---|---|---|
| 8,087,318 B2* | 1/2012 | Bouche | F16H 57/029 |
| | | | 74/421 R |
| 2004/0130224 A1* | 7/2004 | Mogi | H02K 5/1732 |
| | | | 310/75 R |
| 2010/0215491 A1* | 8/2010 | Mockridge | F04D 29/059 |
| | | | 415/229 |
| 2010/0307273 A1* | 12/2010 | Adcock | F16H 57/039 |
| | | | 74/434 |
| 2016/0047458 A1 | 2/2016 | Esterle et al. | |

FOREIGN PATENT DOCUMENTS

| | | |
|---|---|---|
| DE | 102006017905 A1 | 10/2007 |
| EP | 1582775 A1 | 10/2005 |

* cited by examiner

METHOD FOR ASSEMBLING A DRIVE UNIT

CROSS-REFERENCE TO RELATED APPLICATIONS

This application is the U.S. National Phase of PCT Appln. No. PCT/DE2017/100089 filed Feb. 7, 2017, which claims priority to DE 10 2016 206 479.7 filed Apr. 18, 2016, the entire disclosures of which are incorporated by reference herein.

TECHNICAL FIELD

The disclosure relates to a method for assembling a drive unit for a vehicle and to a drive unit that can be assembled by said method.

BACKGROUND

During the assembly of an electric drive unit, the transmission is generally attached to the electric machine. This procedure is complex and time-consuming owing to the flow of components.

SUMMARY

It is an object of the present disclosure to further develop a method for assembling a drive unit and to further develop the drive unit itself, wherein, for example, the flow of components is optimized.

A drive unit according to the disclosure for a vehicle may include an electric machine having a stator and a rotor as well as a transmission device arranged in a transmission housing, wherein a transmission input shaft for torque transmission is arranged between the electric machine and the transmission device, wherein the transmission input shaft is formed from a rotor shaft and a pinion shaft arranged radially thereon, and wherein a respective set of splines for connecting the motor shaft and the pinion shaft for conjoint rotation is formed radially between the rotor shaft and the pinion shaft. In other words, a respective set of splines is formed both on the rotor shaft and on the pinion shaft, wherein the two sets of splines are formed in a manner substantially complementary to one another and are provided for the purpose of implementing a connection for conjoint rotation for the transmission of a torque and of a speed between the rotor shaft and the pinion shaft. For example, the transmission input shaft may serve as an interface between the electric machine and the transmission device.

A method according to the disclosure for assembling the abovementioned drive unit may comprise the following method steps: mounting the transmission device in the transmission housing; passing an assembly mandrel axially through an aperture in the transmission housing and through a pinion shaft, which is designed as a hollow shaft and is rotatably mounted in the transmission housing; centering the rotor shaft, which is designed at least partially as a hollow shaft, on the assembly mandrel; pushing a rotor of the electric machine axially onto the rotor shaft; inserting the rotor shaft axially into the pinion shaft, wherein a set of splines on the rotor shaft engages in a set of splines on the pinion shaft; pushing the stator of the electric machine axially onto the rotor of the electric machine and fixing the stator on the transmission housing; removing the assembly mandrel and closing the aperture in the transmission housing with a closure cover. Thus, assembly of the drive unit may require just the assembly mandrel, which is used at the interface between the electric machine and the transmission device. A rotor shaft designed at least partially as a hollow shaft should be taken to mean that the rotor shaft has at least one axially limited region which is designed as a hollow shaft. In other words, the rotor shaft has a centrally arranged, axially formed aperture in one end face, which is provided for the purpose of at least partially receiving the assembly mandrel. For example, the assembly mandrel may be of cylindrical design and be axially sprung.

The stator may be accommodated in a housing flange, wherein the housing flange has a bearing location, which is provided for the purpose of accommodating a third bearing element for supporting the rotor shaft. During the assembly of the drive unit, the housing flange with the stator arranged therein may be screwed to the transmission housing. In this case, the housing flange at least partially projects axially into a transmission housing section provided for this purpose. The stator is formed radially around the rotor. Furthermore, the third bearing element may be designed as a floating bearing.

According to a one embodiment, the pinion shaft is rotatably mounted in the transmission housing by at least one first and second bearing element, wherein the first bearing element is designed as a floating bearing and wherein the second bearing element is designed as a fixed bearing. The first and second bearing element each comprise an outer race, which makes non-rotatable contact in the transmission housing, an inner race, which makes contact for conjoint rotation on the pinion shaft, and a respective rolling element row, which is arranged radially between the respective outer race and the respective inner race.

According to another embodiment, the pinion shaft has a first and a second raceway on an outer circumferential surface, wherein the respective raceway is provided for the purpose of accepting a respective rolling element row of a respective bearing element. In other words, the respective raceway replaces a respective inner race of a respective bearing element on the pinion shaft. For example, the respective raceway may be formed by grinding the pinion shaft using a profiled grinding disk. The bearing assembly comprising the two bearing elements may be designed as a preloaded bearing assembly. During the mounting of the pinion shaft, the pinion shaft or a bearing race is moved on its seat until the bearing assembly has the desired play or the necessary preload.

A spring element for producing an elastic preload may be arranged axially between the transmission housing and an outer race of a bearing element. However, it is furthermore also conceivable for the spring element to be omitted and for the outer races to be installed with a rigid preload. For example, shims, optionally of different heights, may be provided for this purpose.

The respective bearing element may be designed as an angular ball bearing. However, it is furthermore also conceivable for the respective bearing element to be designed as a taper roller bearing.

In another embodiment, the transmission housing has an aperture, wherein a closure cover for closing the aperture is arranged in the aperture. The aperture is provided for the purpose of passing through the assembly mandrel during the mounting of the electric machine. For example, the aperture may be formed coaxially with the pinion shaft. This enables the assembly mandrel to be passed axially through the pinion shaft during assembly in order to center the rotor shaft and insert it axially into the pinion shaft.

The disclosure includes the technical teaching that the transmission device has a first and a second output shaft, wherein the respective output shaft is provided for connection to a respective wheel of a vehicle axle. In this case, the respective output shaft and thus also the vehicle axle are formed parallel to the rotor shaft and thus parallel to the transmission input shaft.

BRIEF DESCRIPTION OF THE DRAWINGS

Further measures that improve the disclosure are explained in greater detail below together with the description of two example embodiments of the disclosure with reference to the three figures, in which identical or similar elements are provided with the same reference signs. Here.

DETAILED DESCRIPTION

Figure 1:
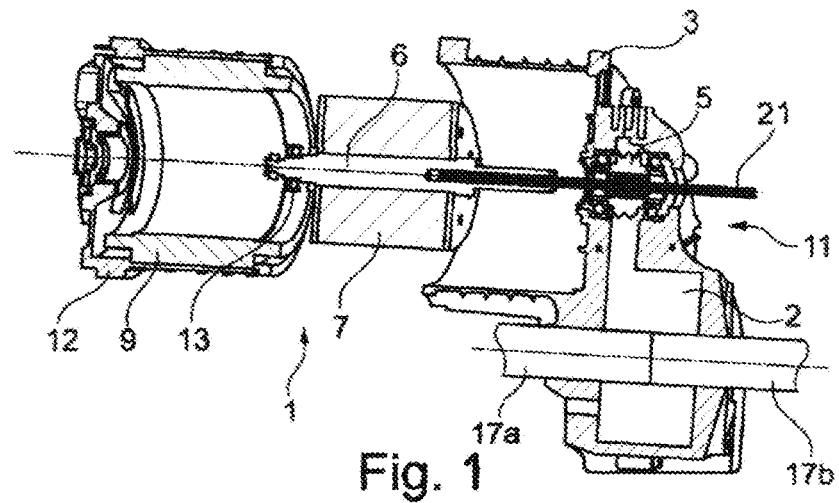
FIG. 1 shows a highly simplified schematic sectional view intended to illustrate the construction of a drive unit according to the disclosure.

According to FIG. 1, a drive unit according to the disclosure for a motor vehicle—not shown here—has an electric machine 1 with a stator 9 and a rotor 7 as well as a transmission device 2. The transmission device 2 is arranged in a transmission housing 3. The electric machine 1 is furthermore also arranged in a section of the transmission housing 3 provided for this purpose, wherein the rotor 7 and the stator 9 are illustrated in an exploded view. In particular, the stator 9 is furthermore accommodated in a housing flange 12, wherein the housing flange 12 has a bearing location, which is provided for the purpose of accommodating a third bearing element 13 for supporting a rotor shaft 6. The rotor 7 is arranged for conjoint rotation on an outer circumferential surface of the rotor shaft 6 and is provided for the purpose of producing, together with the stator 9, a driving output, which is fed into the transmission device 2 via the rotor shaft 6 for distribution between two output shafts 17a, 17b of the transmission device 2. The two output shafts 17a, 17b are formed parallel to the rotor shaft 6. The respective output shaft 17a, 17b is furthermore connected to a respective wheel—not shown here—on a vehicle axle. Thus, the drive unit according to the disclosure is provided for an electric axle drive of the motor vehicle.

A pinion shaft 5 designed as a hollow shaft is furthermore rotatably mounted in the transmission housing 3. Together with the pinion shaft 5 arranged radially thereon, the rotor shaft 6 forms a transmission input shaft 11. The transmission input shaft 11 is provided for torque transmission between the electric machine 1 and the transmission device 2 and thus serves as an interface between the electric machine 1 and the transmission device 2.

Figure 2:
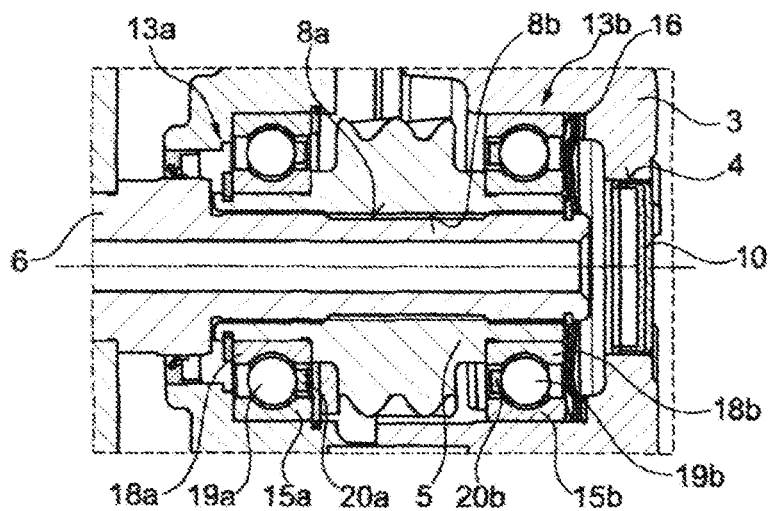
FIG. 2 shows a schematic sectioned detail view intended to illustrate the construction of and support for the transmission input shaft in accordance with a first illustrative embodiment.

FIG. 2 shows a detail from FIG. 1. According to FIG. 2, a respective set of splines 8a, 8b for connecting the rotor shaft 6 and the pinion shaft 5 for conjoint rotation is formed radially between the rotor shaft 6 and the pinion shaft 5. The pinion shaft 5 is rotatably mounted in the transmission housing 3 by a first and second bearing element 13a, 13b, wherein the first bearing element 13a is designed as a fixed bearing and wherein the second bearing element 13b is designed as a floating bearing. The first and second bearing elements 13a, 13b each comprise an outer race 15a, 15b, which is arranged non-rotatably in the transmission housing 3, an inner race 18a, 18b, which is arranged for conjoint rotation on the pinion shaft 5, and a respective rolling element row 19a, 19b, which is arranged radially between the respective outer race 15a, 15b and the respective inner race 18a, 18b and is guided by a respective cage 20a, 20b. In particular, the respective bearing element 13a, 13b may be designed as an angular ball bearing. A spring element 16 for producing an elastic pre-load is arranged axially between the transmission housing 3 and an outer race 15b of bearing element 13b. In particular, the spring element 16 may be designed as a diaphragm spring.

Figure 3:
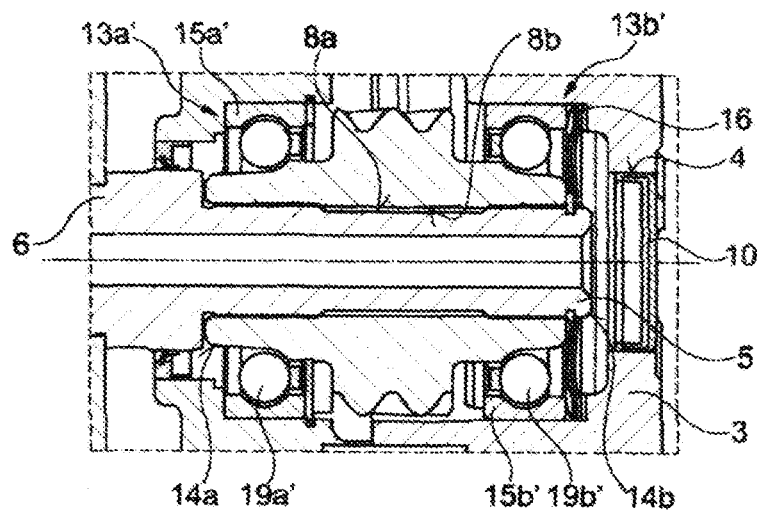
FIG. 3 shows a schematic sectioned detail view intended to illustrate the construction of and support for the transmission input shaft in accordance with a second illustrative embodiment.

FIG. 3 shows a second embodiment of the drive unit according to the disclosure. This differs from the embodiment shown in FIG. 2 in that the pinion shaft 5 has a first and a second raceway 14a, 14b on an outer circumferential surface, wherein the respective raceway 14a, 14b is provided for the purpose of accepting a respective rolling element row 19a', 19b' of a respective bearing element 13a', 13b'. Consequently, according to the embodiment in FIG. 3, the respective inner race 18a, 18b, which is illustrated in FIG. 2, is eliminated. Thus, the respective rolling element row 19a', 19b' is arranged radially between the pinion shaft 5 and a respective outer race 15a', 15b'. The respective bearing element 13a', 13b' is designed as an angular ball bearing. A spring element 16 for producing an elastic preload is arranged axially between the transmission housing 3 and the outer race 15b' of the bearing element 13b'.

According to both FIGS. 2 and 3, the transmission housing 3 has an aperture 4, wherein a closure cover 10 for closing the aperture 4 is arranged in the aperture 4. The aperture 4 is formed coaxially with the pinion shaft 5 and is used for assembling the drive unit.

The method for assembling the drive unit may generally include seven assembly steps. In a first assembly step, the transmission device 2 is mounted in the transmission housing 3. This gives rise, in particular, to the advantage that the transmission device 2 can be tested before the installation of the electric machine 1. After this, an assembly mandrel 21 is passed through the aperture 4 in the transmission housing 3 and through the pinion shaft 5, which is designed as a hollow shaft. In a third assembly step, the rotor shaft 6, which is designed at least partially as a hollow shaft, is centered on the cylindrical assembly mandrel. During this process, the assembly mandrel 21 penetrates at least partially into the rotor shaft 6. In a fourth step, the rotor 7 is pushed axially onto the rotor shaft 6. As an alternative, the rotor 7 can already be arranged on the rotor shaft 6, with the result that pushing the rotor 7 axially onto the rotor shaft 6 during assembly may be eliminated. After this, the rotor shaft 6 is inserted axially into the pinion shaft 5, wherein the set of splines 8a on the rotor shaft 6 engages in the set of splines 8b on the pinion shaft 5. In a sixth assembly step, the stator 9 of the electric machine 1 is pushed axially onto the rotor 7 of the electric machine 1. The stator 9 is fixed on the transmission housing 3, wherein, in particular, the housing flange 12 in which the stator 9 is accommodated is screwed to the transmission housing 2. Finally, the assembly mandrel 21 is removed and the aperture 4 in the transmission housing 3 is closed by the closure cover 10.

LIST OF REFERENCE SIGNS 1 electric machine
2 transmission device 3 transmission housing
4 aperture
5 pinion shaft
6 rotor shaft
7 rotor
8a, 8b set of splines
9 stator
10 closure cover
11 transmission input shaft
12 housing flange
13a-13c bearing element
13a', 13b' bearing element
14a, 14b raceway
15a, 15b outer race
15a', 15b' outer race
16 spring element
17a, 17b output shaft
18a, 18b inner race
19a, 19b rolling element row
19a', 19b' rolling element row
20a, 20b cage
21 assembly mandrel

The invention claimed is:

1. A method for assembling a drive unit for a vehicle, wherein the drive unit has an electric machine and a transmission device, the method comprising:
mounting the transmission device in a transmission housing;
passing an assembly mandrel axially through an aperture in the transmission housing and through a pinion shaft, which is designed as a hollow shaft and is rotatably mounted in the transmission housing;
centering a rotor shaft, which is designed at least partially as a hollow shaft, on the assembly mandrel;
pushing a rotor of the electric machine axially onto the rotor shaft;
inserting the rotor shaft axially into the pinion shaft, wherein a set of splines on the rotor shaft engages in a set of splines on the pinion shaft;
pushing a stator of the electric machine axially onto the rotor of the electric machine and fixing the stator on the transmission housing; and
removing the assembly mandrel and closing the aperture in the transmission housing with a closure cover.

2. A drive unit for a vehicle comprising:
an electric machine having a stator and a rotor as well as a transmission device arranged in a transmission housing,
wherein a transmission input shaft for torque transmission is arranged between the electric machine and the transmission device,
wherein the rotor is arranged radially on a first end of the transmission input shaft and a pinion shaft is arranged radially on a second end of the transmission input shaft,
wherein a respective set of splines for connecting the transmission input shaft to the pinion shaft for conjoint rotation is formed radially between the transmission input shaft and the pinion shaft,
wherein the second end of the transmission input shaft is hollow, and
wherein the transmission housing has an aperture adjacent to the second end of the transmission shaft and a closure cover for closing the aperture is arranged in the aperture.

3. The drive unit as claimed in claim 2, wherein the stator is accommodated in a housing flange and the housing flange has a bearing location, which is provided for the purpose of accommodating a bearing element for supporting the first end of the transmission input shaft.

4. The drive unit as claimed in claim 2, wherein the pinion shaft is rotatably mounted in the transmission housing by at least one first and second bearing element, wherein the first bearing element is designed as a fixed bearing and wherein the second bearing element is designed as a floating bearing.

5. The drive unit as claimed in claim 4, wherein a spring element for producing an elastic preload is arranged axially between the transmission housing and an outer race of a bearing element.

6. The drive unit as claimed in claim 4, wherein the respective bearing element is designed as an angular ball bearing.

7. The drive unit as claimed in claim 2, wherein the pinion shaft has a first and a second raceway on an outer circumferential surface and the respective raceway is provided for the purpose of accepting a respective rolling element row of a respective bearing element.

8. The drive unit as claimed in claim 2, wherein the transmission device has a first and a second output shaft and each output shaft is provided for connection to a wheel of a vehicle axle.

9. The drive unit as claimed in claim 2, wherein the aperture is formed coaxially with the pinion shaft.

10. A drive unit for a vehicle, the drive unit assembled by:
mounting a transmission device in a transmission housing;
passing an assembly mandrel axially through an aperture in the transmission housing and through a pinion shaft, which is designed as a hollow shaft and is rotatably mounted in the transmission housing;
centering a rotor shaft, which is designed at least partially as a hollow shaft, on the assembly mandrel;
pushing a rotor of an electric machine axially onto the rotor shaft while the assembly mandrel is extended through the aperture and pinion shaft;
inserting the rotor shaft axially into the pinion shaft, wherein a set of splines on the rotor shaft engages in a set of splines on the pinion shaft;
pushing a stator of the electric machine axially onto the rotor of the electric machine and fixing the stator on the transmission housing; and
removing the assembly mandrel after inserting the rotor shaft into the pinion shaft and closing the aperture in the transmission housing with a closure cover;
wherein the drive unit comprises the stator, the rotor, the transmission device, and the transmission housing, wherein a transmission input shaft arranged between the electric machine and the transmission device comprises the rotor shaft and the pinion shaft, wherein the splines for connecting the rotor shaft and the pinion shaft are formed radially between the rotor shaft and the pinion shaft.

11. The drive unit as claimed in claim 10, wherein the stator is accommodated in a housing flange and the housing flange has a bearing location, which is provided for the purpose of accommodating a bearing element for supporting the rotor shaft.

12. The drive unit as claimed in claim 10, wherein the pinion shaft is rotatably mounted in the transmission housing by at least one first and second bearing element, wherein the first bearing element is designed as a fixed bearing and wherein the second bearing element is designed as a floating bearing.

13. The drive unit as claimed in claim 12, wherein a spring element for producing an elastic preload is arranged axially between the transmission housing and an outer race of a bearing element.

14. The drive unit as claimed in claim 12, wherein the respective bearing element is designed as an angular ball bearing.

15. The drive unit as claimed in claim 10, wherein the pinion shaft has a first and a second raceway on an outer circumferential surface and the respective raceway is provided for the purpose of accepting a respective rolling element row of a respective bearing element.

16. The drive unit as claimed in claim 10, wherein the transmission device has a first and a second output shaft and each output shaft is provided for connection to a wheel of a vehicle axle.

17. The drive unit as claimed in claim 10, wherein the aperture is formed coaxially with the pinion shaft.

* * * * *